March 28, 1939.   C. C. COONS   2,152,241
ABSORPTION REFRIGERATION
Filed June 3, 1935
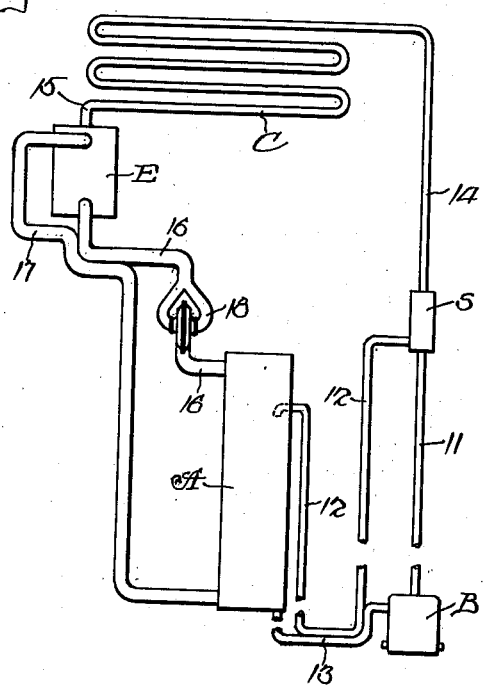
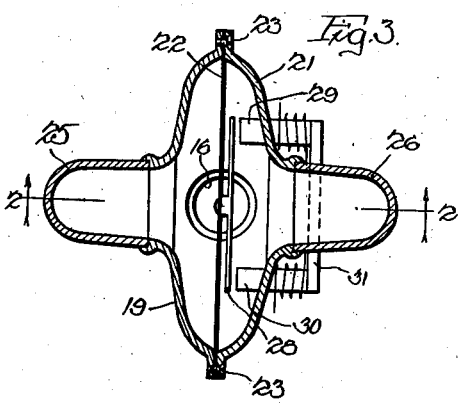
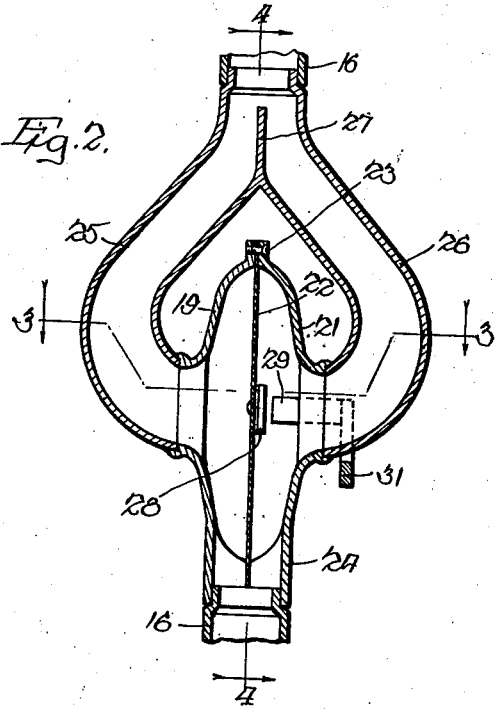
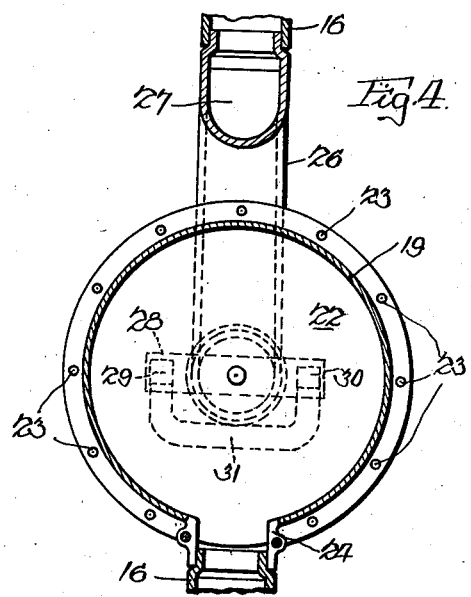
Inventor:
Curtis C. Coons
By Harry S. Smares, Atty.

Patented Mar. 28, 1939

2,152,241

UNITED STATES PATENT OFFICE 2,152,241

ABSORPTION REFRIGERATION

Curtis C. Coons, North Canton, Ohio, assignor to The Hoover Company, North Canton, Ohio, a corporation of Ohio Application June 3, 1935, Serial No. 24,675

15 Claims. (Cl. 62—119.5)

This invention relates to continuous absorption refrigerating apparatus of the type in which an inert gas is employed and more particularly to means for circulating the inert gas.

Continuous absorption refrigerating systems in which an inert gas is employed and in which it is circulated by power driven means such as a fan is well known. According to certain prior constructions, it is necessary to extend a rotatable shaft through a side wall of the apparatus. This presents the disadvantage that the apparatus is liable to leak, especially after the parts which move have become worn. It also presents the problem of providing a structure in which the apparatus will have long life since the bearings for the shaft are apt to corrode especially if subjected to fluids in the system which have a corrosive effect upon the metals employed.

It is one object of the present invention to provide an improved gas circulating means adapted for use in a refrigerating system of the above specified type, but in which the disadvantages and the defects of constructions heretofore known are overcome.

It is a further object of the invention to provide gas circulating means which will have long life, which will be practically noiseless, which will have low operating cost, and which can be inexpensively manufactured.

Other objects and advantages reside in certain novel features of the arrangement and construction of parts as will be apparent from the following description taken in connection with the accompanying drawing, in which Figure 1 is a diagram of a continuous absorption refrigerating system in which a gas circulator constructed in accordance with the present invention is incorporated;

Figure 2 is a vertical cross-sectional view of the gas circulating device shown in Figure 1;

Figure 3 is a transverse cross-sectional view of the gas circulating device shown in Figures 1 and 2, the view being taken on the line 3—3 of Figure 2; and Figure 4 is a vertical cross-sectional view of the same gas circulating device, the section being taken on the line 4—4 of Figure 2.

Referring to the drawing in detail and first to the diagrammatic illustration in Figure 1, it will be seen that a continuous absorption refrigerating system is illustrated as consisting of a boiler B, a gas separation chamber S, a condenser C, an evaporator E, and an absorber A as essential elements, these devices being connected by a number of conduits to form the complete refrigerating system.

The boiler B is connected to the gas separation chamber S by means of the conduit 11 which may act as a gas lift pump to convey both absorption liquid and refrigerant gas into the gas separation chamber S. From this chamber the liquid flows into the absorber A through the U-shaped conduit 12. The absorber A may consist merely of a vertical tank with a number of baffle plates therein. The absorption liquid supplied to the upper end thereof by the conduit 12 trickles downwardly over the baffles and leaves the absorber through the conduit 13 through which it flows back to the boiler B. The conduits 12 and 13 may be in heat exchange relation as illustrated.

Refrigerant gas generated in the boiler B, the conduit 11, or the gas separation chamber S passes upwardly through a conduit 14, a portion of which may act as a rectifier, and into the condenser C. The condenser C may consist merely of a coil of pipe so arranged that the refrigerant gas supplied thereto, upon being cooled, condenses and flows into the evaporator E through the conduit 15.

The evaporator E may consist merely of a vertical tank provided with baffle plates. It is connected to the absorber by means of two inert gas conduits designated as 16 and 17, the conduit 16 having a gas circulating device or pump, represented generally by the reference number 18, incorporated therein. As illustrated in Figure 1, the conduit 16 connects the top of the absorber to the bottom of the evaporator. The conduit 17, on the other hand, connects the top of the evaporator to the bottom of the absorber. The conduits 16 and 17 can be in heat exchange relation over a portion of their path as illustrated in Figure 1. When the pump 18 is in operation, gas passes upwardly through the upper part of conduit 16, through the evaporator E, the conduit 17, the absorber A and the lower portion of conduit 16 back to the pump 18.

When inert gas is circulated between the evaporator and the absorber, the refrigerant supplied to the evaporator in liquid form evaporates to produce cooling effect and is conveyed into the absorber where it is absorbed by the absorption liquid flowing therethrough and thus returned to the boiler B.

In accordance with known practices water may be used as the absorption liquid, ammonia as the refrigerant, and hydrogen as the inert gas.

The gas circulating device or pump 18 diagrammatically illustrated in Figure 1 is shown in detail in Figures 2, 3, and 4. This pump consists essentially of two complementary cup shaped casing members 19 and 21 having a diaphragm 22 clamped therebetween by means of screws 23 together with electro-magnetic means for vibrating the diaphragm.

The bottom of the casing formed by the members 19 and 21 is provided with a cylindrical portion or nipple 24 adapted to receive the lower portion of the conduit 16 and tightly clamp the same so as to provide a gas inlet to the pump chamber. Each of the cup shaped casing members 19 and 21 have centrally located openings therein to which bent pipes 25 and 26 are integrally connected, these pipes passing upwardly to a point above the casing where they are joined together and connected to a portion of the conduit 16. After the pump is mounted in position in the conduit 16 the joints which connect it in the conduit may be welded to insure a gas-tight assembly.

As shown in Figure 2 a dividing partition 27 may be provided at the juncture of the conduits 25 and 26 to aid in directing the flow of gases upwardly through the pump assembly and conduit 16.

Any suitable means may be employed for vibrating the diaphragm 22. In the arrangement illustrated an armature 28 is secured to the diaphragm and is so disposed as to become a part of the magnetic circuit of an electro-magnet mounted upon the portion 21 of the casing. As shown in Figure 3 the electro-magnet may consist of two pole pieces 29 and 30 welded in flanged openings in the casing member, the pole pieces being joined by an iron bar 31 on the outside of the casing, and energized by a coil of wire through which an alternating current may be passed. In order to prevent magnetic losses in the casing member 21, this member should be made of material having low permeability. Certain kinds of stainless steel have been found to be suitable for this purpose.

When the electro-magnet is energized the diaphragm will be vibrated and gas will be pumped upwardly through the pump assembly. This action is due largely to the location of the conduits 25 and 26, these being connected to the casing members 19 and 21 on opposite sides of the central part of the diaphragm where the movement of the diaphragm is the greatest. As the diaphragm moves to the left, as viewed in Figure 2, gas will be forced into the conduit 25 and as it moves to the right, into the conduit 26. As gas is expelled outwardly from the casing through the conduits 25 and 26 additional gas enters the casing from its periphery, through the entrance connection 24 so that the flow through the casing is brought about. Since the diaphragm may vibrate at a comparatively high frequency, for example when in synchronism with 60 cycle alternating current in the energizing coil of the magnet, the flow upwardly through the conduits 25 and 26 may be practically continuous, there being but little, if any, tendency for the gas to pass from one side of the diaphragm through the conduits 25 and 26 to the other side thereof as would be the case if the diaphragms moved very slowly. The dividing partition 27 at the juncture of the conduits 25 and 26 aids the diaphragm in pumping the gas upwardly through the conduit 16. It will thus be seen that a very simple and compact pump has been provided.

While only one embodiment of the invention has been shown and described herein it is obvious that various changes may be made without departing from the spirit of the invention or the scope of the annexed claims.

I claim:

1. In an absorption refrigerating system using an inert gas, a gas pump for causing the inert gas to circulate, said pump including a casing hermetically sealed to a part of said system, a diaphragm mounted for vibratory movement in said casing, electromagnetic means for actuating said diaphragm, means for admitting gas to the periphery of said casing at a point between a portion thereof and said diaphragm, and means located near the center of said diaphragm for conveying gas away from said casing under the influence of the motion imparted to the gas by the vibratory movement of said diaphragm.

2. In an absorption refrigerating system, a fluid circulator including a diaphragm, means for actuating said diaphragm, means cooperating with said diaphragm to form a plurality of chambers, means for supplying fluid to said chambers, and a plurality of exit conduits, one of which is connected to each of said chambers, the arrangement being such that fluid may be drawn into said chambers through said supplying means and expelled from said chambers through said exit conduits upon movement of said diaphragm.

3. In an absorption refrigerating system using inert gas, a gas pump for causing the inert gas to circulate, said pump including two complementary cup-shaped casing members, a diaphragm, means for securing the members together with the diaphragm therebetween so as to form two chambers of variable volume, means for vibrating said diaphragm to thereby vary the volume of said chambers, means for supplying gas to said chambers and conduits connected to said members on opposite sides of said diaphragm and in line with the direction of motion thereof for conducting gas out of said chambers as a result of the changes in volume therein.

4. In an absorption refrigerating system using inert gas, a gas pump for causing the inert gas to circulate, said pump including a movable diaphragm, means providing chambers on the opposite sides of said diaphragm, two conduits connected to said means and to each other, a dividing partition at the juncture of said conduits, means for supplying gas to said chamber forming means, and means for vibrating said diaphragm, the arrangement being such that motion of said diaphragm causes gas to be forced through said conduits, said dividing partition tending to prevent flow of gas from one of said conduits to the other.

5. In an absorption refrigerating system using inert gas, a gas pump for causing the inert gas to circulate, said pump including a casing member, a diaphragm mounted thereon for forming a chamber therewith, means for vibrating said diaphragm to change the volume of said chamber, means for supplying gas to said chamber, a conduit connected to said casing member and arranged to cooperate with said member and diaphragm to cause gas to flow therethrough in response to the changes in volume in said chamber resulting from motion of said diaphragm.

6. In an absorption refrigerating system, a fluid circulator comprised solely of a casing member, a diaphragm mounted thereon, means for vibrating said diaphragm, a conduit connected to said casing member near the periphery of said diaphragm for supplying fluid thereto and a conduit connected to the central portion of said casing member for discharging fluid therefrom as a result of the motion imparted to the fluid therein by the vibration of said diaphragm.

7. A pump suitable for use in the inert gas circuit of an absorption refrigeration apparatus comprising a diaphragm mounted between inverted, cup-shaped casing members, means positioned to vibrate said diaphragm, gas inlet means at the periphery of the diaphragm directing gas radially inwardly adjacent the surface of the diaphragm, and dual gas outlet means on each side of said casing having axes substantially parallel to the axis of said diaphragm whereby vibration of said diaphragm causes gas near the axis of the diaphragm to flow out through said outlets.

8. A pump suitable for use in the inert gas circuit of an absorption refrigeration apparatus comprising a conduit having an inlet and an outlet, said conduit being divided into two branches intermediate its end, an enlarged chamber joining the main conduit and one end of each of said branch conduits, a diaphragm supported at its periphery in said casing, and means for vibrating said diaphragm, the diaphragm being so arranged in said casing and with respect to the main and branch conduits that vibration thereof will cause a fluid in the main conduit to flow into the casing where part will be forced into one branch conduit, and part into the other branch conduit and thereafter through the outlet end of the main conduit.

9. The method of displacing a fluid stream comprising dividing the stream into two parts, leading said parts in substantially parallel and substantially unrestricted paths to a focal point, and suddenly imparting movement in opposite directions to first one stream and then the other whereby uni-directional movement is imparted to each stream.

10. The method of circulating an inert gas in an absorption refrigeration apparatus comprising forming a stream of the gas, dividing the stream into two substantially unrestricted parallel portions, suddenly imparting movement to first one stream and then the other in a direction other than that of said divided streams whereby unidirectional movement is imparted to each stream, and then joining said streams to form a single propelled stream.

11. In an absorption refrigeration system, the combination of an evaporator, an absorber, conduits connecting the evaporator and the absorber to form a path for the flow of an inert gas therebetween, a pump in one of said conduits for circulating the inert gas, said pump comprising a casing having a diaphragm dividing the same into two chambers, an inlet opening from one of said conduits to each of said chambers, an outlet opening from each of said chambers, and means for vibrating this diaphragm thereby causing inert gas to enter first one of said chambers and then the other through said inlet and to discharge first through one and then the other of said outlet openings whereby the inert gas is circulated between the evaporator and absorber.

12. A valveless fluid circulating device adapted for use in an absorption refrigeration system comprising a housing member having a fluid discharge opening therein, a diaphragm mounted in said housing and forming a chamber therewith, a discharge opening from said chamber, a fluid inlet opening to said chamber spaced from said discharge opening and positioned near the periphery of said diaphragm, and means for vibrating said diaphragm to vary the volume of said chamber and cause the fluid to enter through said inlet and to be discharged through said discharge opening.

13. A valveless fluid circulating device comprising a vibratable diaphragm cooperating with a housing member to form a chamber, a discharge opening therefrom opposite a point of relatively great amplitude of vibration of said diaphragm, an inlet opening near a point of relatively small amplitude of vibration of said diaphragm, and means for vibrating said diaphragm whereby fluid is caused to enter said chamber through the inlet opening and to be discharged through said discharge opening.

14. A valveless fluid circulating device comprising a vibratable diaphragm cooperating with a housing member to provide a chamber on each side thereof, discharge openings from said chambers opposite a point of relatively great amplitude of vibration of said diaphragm, inlet openings to said chambers near a point of relatively small amplitude of vibration of said diaphragm, and means for vibrating said diaphragm whereby fluid is caused to enter each of said chambers through said inlets and to be discharged therefrom through said discharge openings.

15. A fluid circulating and dividing device comprising a fluid supply conveyor leading to a housing, a diaphragm dividing said housing into two chambers, discharge conduits leading from said chambers opposite points of relatively great vibration of said diaphragm, said supply conveyor opening into each chamber at a point of relatively small vibration of said diaphragm, and means operable to vibrate the diaphragm to cause fluid to enter each chamber and to discharge first through one of said discharge conduits and then the other whereby the fluid is circulated and divided into two streams.

CURTIS C. COONS.